United States Patent [19]

Feuerstein et al.

[11] Patent Number: 4,805,108
[45] Date of Patent: Feb. 14, 1989

[54] LOW FLIGHT METHOD FOR AUTOMATIC COURSE DETERMINATION

[75] Inventors: Dieter W. Feuerstein, Munich; Otto Bernhard, Grafing, both of Fed. Rep. of Germany

[73] Assignee: Messerschmitt-Bölkow-Blohm GmbH, Munich, Fed. Rep. of Germany

[21] Appl. No.: 13,453

[22] Filed: Feb. 11, 1987

[30] Foreign Application Priority Data

Feb. 12, 1986 [DE] Fed. Rep. of Germany ..... 36044016

[51] Int. Cl.⁴ .............................................. G06F 15/50
[52] U.S. Cl. .................................... 364/433; 364/461
[58] Field of Search ............... 364/461, 462, 449, 433; 342/29, 64, 65

[56] References Cited

U.S. PATENT DOCUMENTS

| 4,063,073 | 12/1977 | Strayer | 364/439 |
| 4,224,669 | 9/1980 | Brame | 364/433 |
| 4,514,733 | 4/1985 | Schmidtlein et al. | 340/970 |
| 4,602,336 | 7/1986 | Brown | 342/461 |
| 4,675,823 | 6/1987 | Noland | 364/460 |
| 4,700,307 | 10/1987 | Mons et al. | 364/453 |

Primary Examiner—Parshotam S. Lall
Assistant Examiner—Thomas G. Black
Attorney, Agent, or Firm—Kenyon & Kenyon

[57] ABSTRACT

A low flight method for automatic course determination when approaching a given target site is disclosed wherein a terrain memory is used in which terrain points in grid type distribution of the terrain in question with height coordinates associated with them are stored digitally (digital terrain height model). By means of a rough analyzer, spaced at possibly variable first time intervals $\Delta T$ over the multitude of points of the digital terrain height model, a first fan ($F_n$) starting from a respective momentary flight position ($P_1$) and oriented with its center direction ($M_F$) toward the target site ($P_2$) and consisting of several adjacent segments ($S_i$) is placed. For each segment ($S_i$) a mean value of the height coordinates of the terrain points situation in it is calculated, and the segment ($S_4$) having the smallest mean value is determined. By means of a fine analyzer (4), within each of the first time intervals $\Delta T$ in multiple spaced succession of comparatively shorter second time intervals $\Delta t$ over the multitude of points of the digital terrain height model, a second fan ($f_m$) of smaller radius by comparison with the first fan ($F_n$) starting from the momentary flight position ($P_1$, $P_2$, etc.) and oriented with its center direction ($M_{fm}$) into the momentary flight direction and consisting of three adjacent segments ($s_j$) is placed. For each segment ($s_j$) a mean value of the height coordinates of the terrain points situated in it is calculated, and by means of a flight path finder (5) the three differences of these mean values are formed and compared in each instance with a predeterminable limit value (G). In case none of the three mean values exceeds the limit value (G), a course correction command for approximation to the flight direction which corresponds to the segment previously determined in the rough analyzer, and in case at least one of the respective mean values exceeds the limit value (G), determining the momentary flight course according to which of the respective segments ($s_j$) the lowest mean value is present in.

14 Claims, 2 Drawing Sheets

LOW FLIGHT METHOD FOR AUTOMATIC COURSE DETERMINATION

BACKGROUND OF THE INVENTION

The present invention relates to a low flight method for automatic course determination when approaching a given target site.

Modern combat aircraft are often given the task to approach, from a initial start point, a given target site automatically to the extent possible, and this must be done, to the extent possible, without directly flying over terrain elevations where there is danger that the aircraft is discovered more easily or enters the area of enemy defense measures. Accordingly, the optimum flight path follows the course of clefts in the terrain, and the aircraft should be forced to fly over elevated terrain formations directly only when there are no possibilities of lateral evasion of lower elevation, as for instance in the case of relatively long cross-lying mountain ranges. In addition, such an aircraft should make as little use as possible of a far-reaching radar, because thereby, too, it can be detected more easily. Now the current practice is, for example, in the case of missiles, to make use of the fact that the terrain to be strafed is known as to its formation from topographic maps or by serial reconnaissance. The missile is then made to carry a memory in which this terrain is stored digitally as dots or points.

SUMMARY OF THE INVENTION

The invention takes advantage of the possibility of using such terrain memories, and makes available a low flight method for automatic course determination, in which the course is always determined in such a way that overflight of elevated terrain formations and hence the risk of enemy threat is avoided to the extent possible.

The above and other objects of the present invention are achieved by a low flight method for automatic course determination when approaching a given target site comprising the steps of:

storing digitally in a terrain memory terrain points in grid type distribution of the terrain in question with height coordinates associated with the terrain points to form a digital terrain height model;

forming by means of a rough analyzer, spaced at possibly variable first time intervals $\Delta T$ over the multitude of points of the digital terrain height model, a first fan ($F_n$) starting from a respective momentary flight position ($P_1$) and oriented with a center direction ($M_F$) toward the target site ($P_z$) and comprising a plurality of adjacent segments ($S_i$), calculating for each segment ($S_i$) a mean value of the height coordinates of the terrain points situated in the segment, and determining the segment having the smallest mean value, forming by means of a fine analyzer, within each of the first time intervals $\Delta T$ in multiple spaced succession of comparatively shorter second time intervals $\Delta t$ over the multitude of points of the digital terrain height model, a second fan ($f_m$) of smaller radius by comparison with the first fan ($F_n$) starting from the momentary flight position ($P_1$, $P_2$, etc.) and oriented with a center direction ($M_{fm}$) into the momentary flight direction and comprising a plurality of adjacent segments ($s_j$) and calculating for each segment ($s_j$) a mean value of the height coordinates of the terrain points situated in it; and forming by means of a flight path finder the respective differences of these mean values and comparing in each instance with a predeterminable limit value (G), in case none of the respective mean values exceeds the limit value (G) a course correction command for approximation to the flight direction which corresponds to the segment previously determined in the rough analyzer, and in case at least one of the respective mean values exceeds the limit value (G), determining the momentary flight course according to which of the respective segments ($s_j$) the lowest mean value is present in.

Accordingly, a terrain memory is to be used in which, before the flight is started, the terrain in question is digitally stored in the form of terrain points in grid type distribution as well as the height coordinates associated therewith.

The invention makes it possible to find, on the basis of this stored digital terrain height model, a flight path between the initial start point and the target site which meets the requirements set by the task. This is done with the aid of the data of the digital terrain height model by suitable selection and utilization of these data with the aid of certain hardware components on board the aircraft, but alternatively it can take place before the start of the flight, as simulation.

BRIEF DESCRIPTION OF THE DRAWINGS

In the following, the invention will be explained more specifically with reference to the illustration in an embodiment, in which.

DETAILED DESCRIPTION

Figure 1:
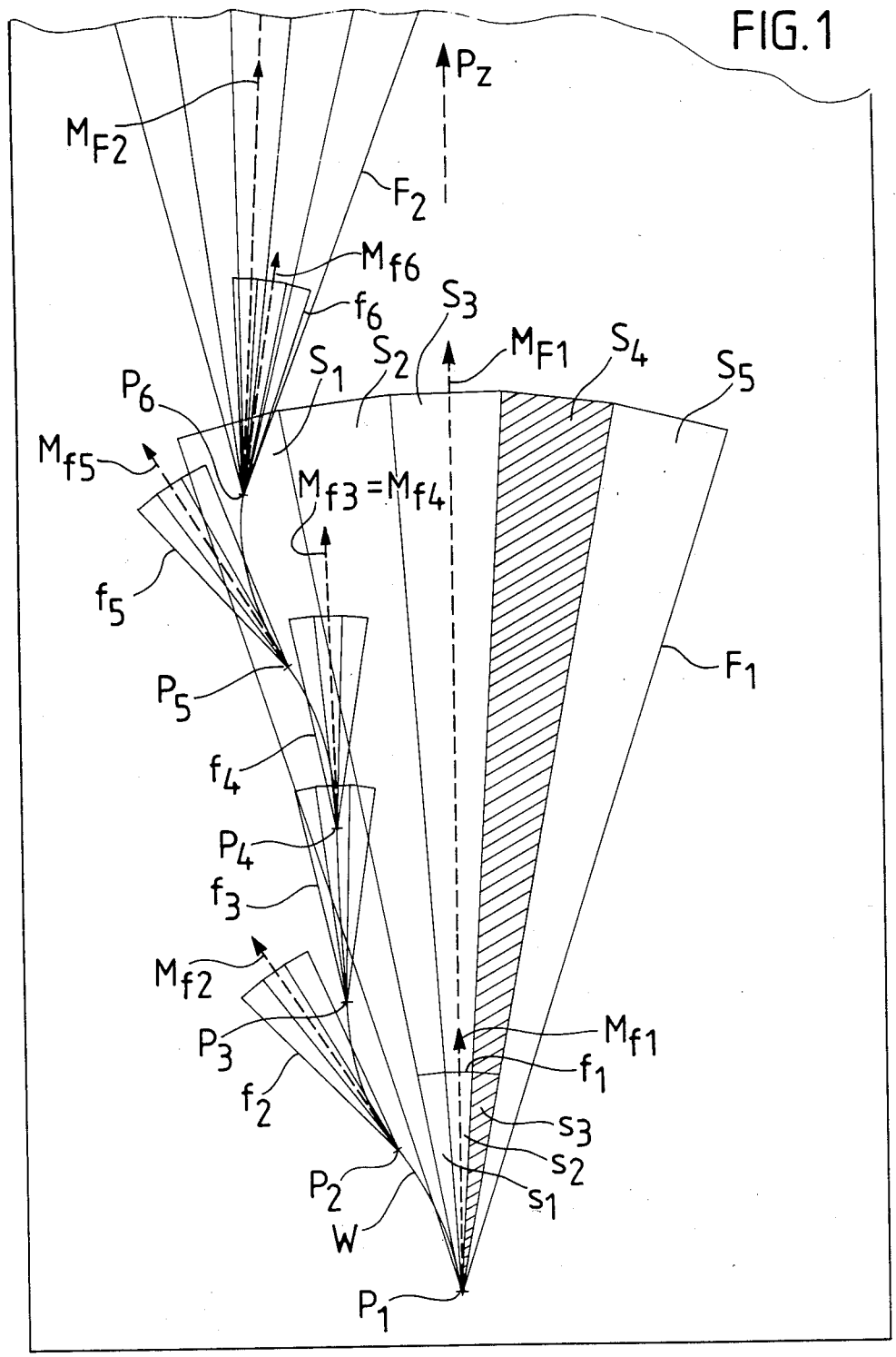
FIG. 1 shows schematically the fans to be placed over the digital terrain height model at various locations of the flight path.

With reference now to the drawings, FIG. 1 shows a part of a rectangular terrain detail. At the lower end of this terrain detail, in the center, is the start point $P_1$ of the aircraft, and the terrain detail is placed so that the target site $P_z$ lies in the upper prolongation, also in the center. Within the entire rectangular terrain detail a network of relatively closely placed terrain points is given, the height coordinates of which are known. These locus coordinates of the terrain points are stored in digital form (digital terrain height model) in a terrain memory carried along by the aircraft. At the very beginning of the flight, at start point $P_1$, a fan $F_1$ of a given radius is placed by a rough analyzer connected to the terrain memory over the multitude of points of the digital terrain height model. This means that the rough analyzer selects from the total multitude of points of the rectangular terrain segment those points which lie within the fan $F_1$, the center direction $M_F$ of which is oriented toward the target site $P_z$. This first fan $F_1$ is subdivided into five segments $S_1$ to $S_5$. Mathematical operations are now carried out in the rough analyzer to calculate for each sector $S_i$ ($1 \leq i \leq 5$) the respective arithmetic means of the height coordinates of the terrain points situated in the sector. Thereafter the sector with the lowest mean value is determined. In the present case this is determined to be the sector $S_4$. This result is at first retained in the rough analyzer. Simultaneously, at the beginning of the flight, an additional, second fan $f_1$ of smaller radius is placed in a fine analyzer over the multitude of points of the digital terrain height model, the center direction $M_{f1}$ of this fan $f_1$ pointing in the momentary flight direction which at the beginning of flight coincides with the center direction $M_F$ of the first fan $F_1$. Here, too, as in the analogous case of the first fan $F_1$, all terrain points situated inside the second fan $f_1$ with their height coordinates are selected, and in a following mathematical operation again the arithmetic means of the height coordinates of the terrain points situated in each of the sectors $s_j (\leq j \leq 3)$ are calculated.

In a connected flight path finder, all of the three differences of the mean values calculated in the fine analyzer are formed. If all three differences are below a given limit value G, a course correction command is given, which leads to an approximation of the flight direction to the direction of the segment with the lowest mean value previously determined in the rough analyzer. If, however, at least one of the three differences is greater than the given limit value G, the momentary flight course is determined according to the criterion in which of the three segments $s_j$ of the second fan $f_1$ the lowest mean value exists. In the present case, illustrated in FIG. 1, the rough analyzer has determined the sector $S_4$. The difference formation of the mean values calculated in the fine analyzer by the flight path finder has led to the result that in fan $f_1$ at least one of the differences exceeds the limit value G. And since the mean value in sector $s_1$ is lowest, a course correction to the left takes place, see the flight path W leading from $P_1$ to $P_2$. When the momentary flight position $P_2$ is reached, or respectively after the lapse of a time interval $\Delta t$, there is selected by the fine analyzer a new, second fan $f_2$, the center direction of which now points in the new momentary flight direction existing in flight position $P_2$. The calculation of the mean values for the three sectors $s_j$ and the comparison of the three differences formed therefrom in the flight path finder results in this case in that none of the three differences exceeds the limit value G. Now there occurs a course correction command for approximation to the flight direction which corresponds to the segment $S_4$ previously determined in the rough analyzer. For the flight position $P_2$ this means a curve to the right. After the lapse of a further time interval $\Delta t$ flight position $P_3$ is reached, where the fine analyzer again places a second fan $f_3$ over the multitude of points of the digital terrain height model. The difference formation of the arithmetic means here shows that the lowest mean value is present in the central sector $s_2$, but that at the same time at least one of the differences exceeds the limit value G, so that now there is straight flight. After a further time interval $\Delta t$ the flight position $P_4$ has been reached, where the corresponding calculations lead to the result that in fan $f_4$ the smallest mean value is in the left sector and at least one of the differences exceeds the limit value G, so that a left hand curve is commanded. In flight position $P_5$ the evaluation within the corresponding second fan $f_5$ shows that none of the differences exceeds the limit value G, so that again a right-hand curve is commanded, in accordance with the direction of the sector $S_4$ previously determined by the rough analyzer in the first fan $F_1$. At flight position $P_6$ the greater time interval $\Delta T$, in this case $\Delta T = 5 \Delta t$, has now passed, and by means of the rough analyzer again a new first fan $F_2$ is placed over the multitude of points of the digital terrain height model, simultaneously with a further second fan $f_6$. The center direction of the new first fan $F_2$ again points in the direction of the target site $P_z$, while that of the second fan $f_6$ points in the momentary flight direction. Everything else takes place according to the previously described criteria. The time intervals $\Delta t$ can be chosen so small that the selection and evaluation of the second fans $f_m$ occurs quasi continuously.

The method has the main advantage that based on the use of a terrain memory with previously stored digital terrain height model it is able to look over the terrain elevations, as it were, which is not possible with a radar carried on board. Besides, the exclusive use of an on-board radar which would represent an additional risk of being discovered, is not necessary. With the aid of the second, large fans $F_n$, to be evaluated at longer time intervals $\Delta T$, it is possible to examine a more extensive terrain area lying ahead to determine in what direction the terrain is on the average lowest. In the example of FIG. 1 this is, for the flight position $P_1$, the sector $S_4$. The more frequent evaluations of the second, smaller fans $f_m$ serve to examine a smaller area lying directly ahead to determine whether it is still possible to fly around any ground elevations, which in the evaluation of the larger fans $F_n$ are swallowed up, as it were, by the mean values. The criterion covering this is the comparison between the differences of the mean values of the three sectors with the given limit value G. If at least one of these differences exceeds the limit value G it means that there are in the corresponding second, smaller fan certain unevennesses of terrain which exceed a given degree, so that in this case a relatively small evasive movement is desirable, the direction of which need not always coincide with the direction given by the previously selected sector of the large fan $F_n$. As soon as the relative terrain height differences, represented by the differences of the mean values of the three sectors, within the second, smaller fan lying directly ahead are smaller than corresponds to the limit value G, the flight course is no longer determined by the mean values of the sectors of the smaller fans, but by the direction of the selected sector of the previously examined large fan. Thus the aircraft is steered again and again in the direction of target site $P_z$.

The method offers some possibilities for adaptation to the terrain to be expected, to a varying flight velocity, and to increasing proximity to the target site. Thus, the limit value G can be increased with increasing unevenness of the terrain to be expected. There may be provided, for example, three different limit values G, a relatively small one for almost flat terrain, a higher one for hilly terrain, and a relatively highest one for mountainous terrain. The time intervals $\Delta T$ and $\Delta t$ can be shortened with increasing flight velocity. The same applies for increasing approximation to the target site $P_z$. Furthermore, it is possible to increase the radii of the first and second fans $F_n$ and $f_m$ with increasing flight velocity.

Since normally a flight is planned exactly before the beginning of the flight, on the ground, the method can be used for simulation on the basis of the existing digital terrain height model with appropriate hardware components. Thus, it can be established also whether any extreme situations are to be expected in the sense that, due to course corrections which follow from the evaluation of the second, smaller fans, the flight path leads too far away from the overall target course. This might be the case in exceptional cases due to extreme terrain formations. This can be counteracted in various ways. Firstly, an "artificial terrain" could be created by providing the digital terrain height model at the lateral edges of the rectangular terrain detail with artificial walls, in such a way that the naturally given terrain heights are elevated datawise to such an extent that, when using the method, a deflection in target direction is here always commanded. Another possibility is to let the limit value G increase toward the sides of the terrain detail. Lastly, the position deviation from the connecting straight line between start position and target site could be measured continuously and a signal given to the pilot when this deviation exceeds a given amount. The pilot then has the possibility at least for a short time to switch to another steering method or to manual operation.

For terrain height-oriented mathematical analysis of the individual fan sectors, the formation of that arithmetic mean of the height coordinates is preferred which due to its especially simple mathematical derivation results in a good real time compatibility. However, other cases are conceivable also for the mean value formation. Thus, it may happen that although in two segments the same arithmetic mean of the height coordinates exists, the height formations clearly differ from each other. As an extreme case one could imagine firstly a completely flat high situated valley, which extends in segment direction, and secondly a terrain formation showing alternately great heights and depths and also extending in segment direction. In this case both segments would be on a par if simply the arithmetic mean is formed and evaluated. In reality, however, the first named segment (flat high valley) should be preferred, because there a much lower mean height above the ground could be maintained. With the second terrain formation referred to, on the other hand, a much greater mean height above ground would result, and besides, the aircraft would be greatly endangered while flying over the peaks, as it could be maintained. With the second terrain formation referred to, on the other hand, a much greater mean height above ground would result, and besides, the aircraft would be greatly endangered while flying over the peaks, as it could not escape an enemy position posted in the next valley. When flying through the high valley, on the contrary, the aircraft would move always close above the ground and because of the radar echoes existing there, could not be detected by an enemy radar. Here, then, it would be desirable to make use, in the segment selection, not of the arithmetic mean, but of a mean which gives greater weight to higher terrain points than to lower ones. With the use of such a mean value the decision would turn out in favor of the flat high valley as this mean value is here smaller than for the other terrain type referred to. Suitable as such a weighting mean value would be, for example, the geometric mean. Another possibility of subjecting the terrain within a segment to a more precise analysis, besides the arithmetic mean formation, is to take into consideration the respective standard deviation. This statistical quantity, too, is a measure of how frequently deviations from the mean occur within the terrain considered. It is, therefore, possible also to select the segment to be preferred in such a way that at approximately equal mean values the segment with the smaller standard deviation is selected, or that even a segment having a higher mean value but clearly lower standard deviation is preferred over one with a lower mean value but clearly higher standard deviation.

While for the first, larger fans a different number of segments may be chosen, the number of segments for the second, smaller fans is appropriately three. Here only a command for straight ahead, left, or right is possible, so that more than three segments would not bring any improvement.

Figure 2:
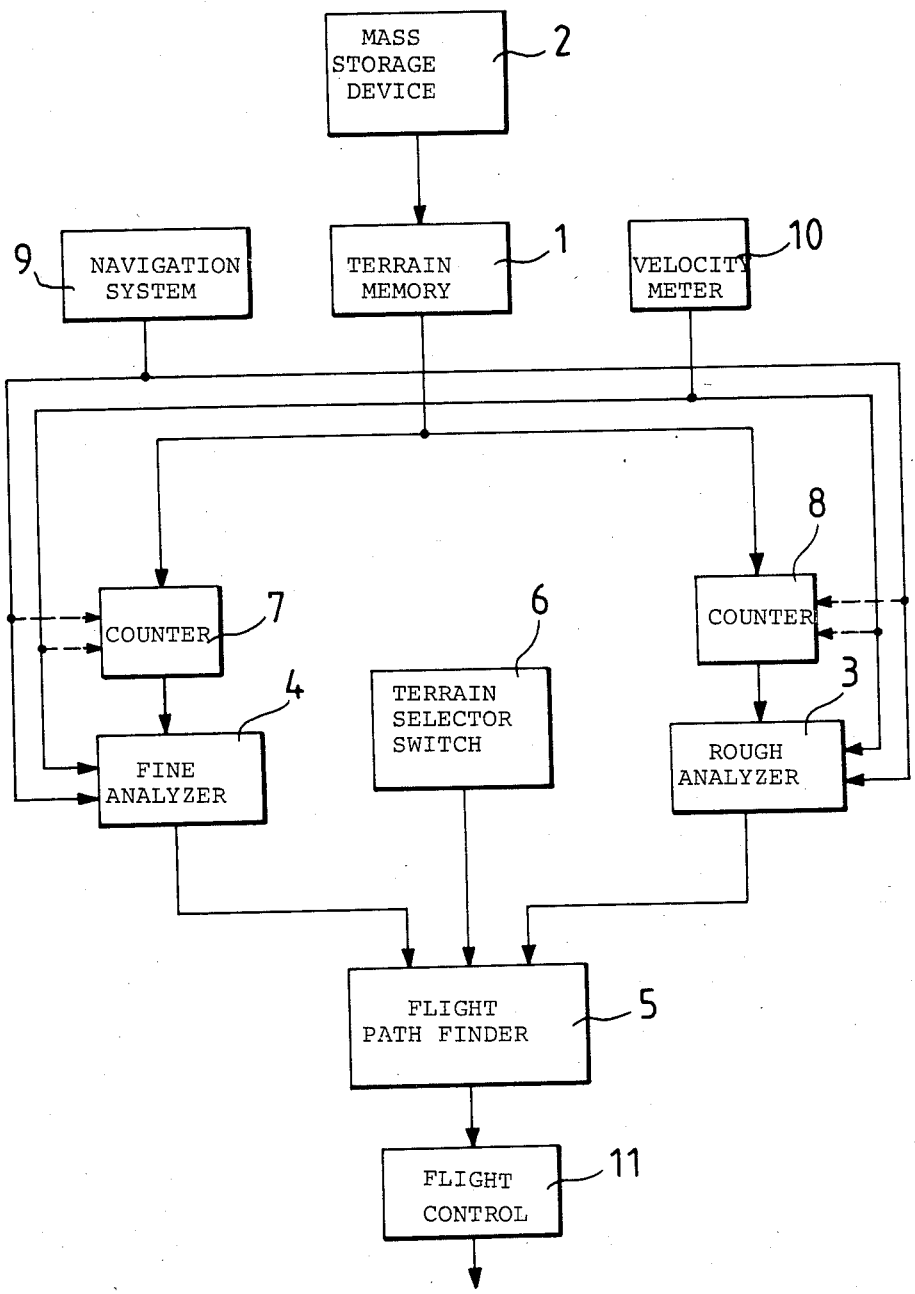
FIG. 2 shows a block diagram.

A block diagram is shown in FIG. 2. In a terrain memory 1 are stored, before flight or simulation begins, the data that are of importance for the actual flight, from a mass storage device 2 containing the terrain data of a very large terrain area. Their scope corresponds to the rectangular area indicated in FIG. 1. The terrain memory 1 thus contains a dense network of terrain points, represented by its locus and height coordinates. Counters 8 and 7 provide for the reading in of terrain data from the terrain memory 1 into the rough analyzer 3 or respectively the fine analyzer 4 at time intervals $\Delta T$ and $\Delta t$, respectively. In so doing, as a function of the respective flight position, data from a larger or smaller fan area are taken into consideration, that is, the fan size is variable. To this end, the rough and fine analyzers 3 and 4, respectively, require further the respective flight position, which is furnished by a navigation system 9. Also, the fans may depend with respect to their radius on the flight velocity v, which is furnished by a velocity meter 10. For setting the time intervals $\Delta t$, $\Delta T$, also information of the navigation system 9 and of the flight velocity meter 10 may be used (shown in broken lines), so that the time intervals can be shortened with increasing approximation to the target site or respectively with increasing flight velocity v. In the rough and fine analyzers 3, 4, the above-described calculations are performed. At the output of the rough analyzer 3 there is then available immediately after the beginning of each time interval $\Delta T$ a value which indicates the direction of the selected segments (for instance $S_4$) with the lowest height average. Analogously, the fine analyzer 4 furnishes, immediately after the beginning of each time interval $\Delta t$, three values, namely the height mean value of the respective three segments. A terrain selector switch 6 sets for a flight path finder 5 connected downstream a limit value G, which represents the terrain structure to be expected. Further, the flight path finder 5 forms from the three mean values of the fine analyzer 4 the three differences, compares them with the limit value G, and delivers a course command to the following flight control 11. The command depends on whether at least one of the differences is greater than the set limit value G. If this is the case, the course command follows that one of the three segments of the respective second, smaller fan in which the smallest mean value is present. From this there results a command for straight ahead, left, or right. If all three differences are smaller than the set limit value G, one uses for the formation of the course command the value present at the output of the rough analyzer 3, so that there results an approximation to the direction which corresponds to the selected segment of the previously evaluated first, larger fan.

In the foregoing specification, the invention has been described with reference to an exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A low flight method for automatic course determination when approaching a given target site, comprising the steps of:

storing digitally, in a terrain memory, terrain points in a grid type distribution and also storing height coordinates associated with the terrain points to form a digital terrain height model;

forming, by means of a rough analyzer, at first time intervals $\Delta T$ over the multitude of points of the digital terrain height model, a first fan ($F_n$) starting from a respective momentary flight position ($P_1$) and oriented with a center direction ($M_F$) toward the target site ($P_2$) and comprising a plurality of adjacent fan segments ($S_i$), calculating for each fan segment ($S_i$) a mean value of the height coordinates of the terrain points situated in the fan segment, and determining the fan segment having the smallest mean value;

forming, by means of a fine analyzer, within each of the first time intervals $\Delta T$ in multiple spaced succession of comparatively shorter second time intervals $\Delta t$ over the multitude of points of the digital terrain height model, a second fan ($f_m$) of smaller radius by comparison with the first fan ($F_n$) starting from the momentary flight position ($P_1$, $P_2$, etc.) and oriented with its center direction ($M_{fm}$) into the momentary flight direction and comprising a plurality of adjacent smaller fan segments ($s_j$), and calculating for each smaller fan segment ($s_j$) a mean value of the height coordinates of the terrain points situated in the respective smaller fan segments;

determining, by means of a flight path finder, the respective differences of said mean values of the smaller fan segments and comparing the differences in each instance with a predetermined limit value (G);

forming, if none of the respective mean values exceeds the limit value (G), a course correction command for approximating the flight direction which corresponds to the fan segment previously determined in the rough analyzer to have the smallest mean value; and forming, if at least one of the respective mean values of the smaller fan segments exceeds the limit value (G), a course correction command for the momentary flight course according to the respective smaller fan segment ($s_j$) the lowest mean value is present in.

2. The low flight method recited in claim 1, wherein the number of smaller fan $S_j$ in the second fan comprises three.

3. The low flight method recited in claim 1, further comprising the step of forming the arithmetic mean for the segments ($S_i$, $S_j$) of the first and/or second fans ($F_n$, $f_m$).

4. The low flight method recited in claim 1, further comprising the step of forming a mean more strongly weighting greater heights for the segments ($S_i$, $S_j$) of the first and/or second fans ($F_n$, $f_m$).

5. The low flight method recited in claim 4 wherein the mean comprises a geometric mean.

6. The low flight method recited in claim 1, wherein, in addition to the mean values, the standard deviations present within the respective segments ($S_i$, $S_j$) are taken into consideration.

7. The low flight method recited in claim 1 wherein the first and second time intervals ($\Delta T$, $\Delta t$) are shortened with increasing approach to the target site ($P_z$).

8. The low flight method recited in claim 1, wherein the first and second time intervals ($\Delta T$, $\Delta t$) are shortened with increasing flight velocity.

9. The low flight method recited in claim 1, wherein the radii of the first and second fans ($F_n$, $f_m$) are enlarged with increasing flight velocity (v).

10. The low flight method recited in claim 1, wherein the limit value (G) is increased with increasing unevenness of the terrain.

11. The method recited in claim 1, wherein the first time intervals $\Delta T$ are variable.

12. The method of claim 1, further comprising the step of storing in the terrain memory, in the presence of an enemy antiaircraft position int he terrain to be flown over, supplementary information quantizing the type and range of the antiaircraft position for the terrain points lying in the vicinity of that position.

13. The method of claim 12, wherein the height coordinates of the terrain points lying in the vicinity of the antiaircraft position are additively increased or provided with a multiplier.

14. The method of claim 13, wherein the amounts of be added to the height coordinates or the multipliers decrease with increasing distance form the menace position.

* * * * *

UNITED STATES PATENT AND TRADEMARK OFFICE
CERTIFICATE OF CORRECTION

PATENT NO. : 4 805 108

DATED : February 14, 1989

INVENTOR(S) : Dieter W. Feuerstein et al

It is certified that error appears in the above-identified patent and that said Letters Patent is hereby corrected as shown below:

In Column 8, line 2, change "...fan $S_j$..." to read --...fan segments ($s_j$)...-- line 6, change "($S_i$, $S_j$)..." to read --...($S_i$, $s_j$)...-- line 10, change "...($S_i$, $S_j$) ..." to read --...($S_i$, $s_j$)...-- line 16, change "...($S_i$, $S_j$)..." to read --...($S_i$, $s_j$)...-- line 34, change "...int he..." to read --...in the ...-- line 42, change "...amounts of..." to read --...amounts to...-- line 44, change "...form..." to read --...from...--

Signed and Sealed this

Twenty-fourth Day of October, 1989

Attest:

DONALD J. QUIGG

*Attesting Officer*   *Commissioner of Patents and Trademarks*